US009931817B2

(12) United States Patent
Rickerl (10) Patent No.: US 9,931,817 B2
(45) Date of Patent: Apr. 3, 2018

(54) METHODS FOR FORMING PATTERNS IN THIN GLASS LAMINATE STRUCTURES (71) Applicant: CORNING INCORPORATED, Corning, NY (US)

(72) Inventor: Paul George Rickerl, Endicott, NY (US)

(73) Assignee: CORNING INCORPORATED, Corning, NY (US)

( * ) Notice: Subject to any disclaimer, the term of this patent is extended or adjusted under 35 U.S.C. 154(b) by 98 days.

(21) Appl. No.: 15/101,040

(22) PCT Filed: Dec. 3, 2014

(86) PCT No.: PCT/US2014/068254
§ 371 (c)(1),
(2) Date: Jun. 2, 2016

(87) PCT Pub. No.: WO2015/084902
PCT Pub. Date: Jun. 11, 2015

(65) Prior Publication Data
US 2016/0297176 A1 Oct. 13, 2016

Related U.S. Application Data (60) Provisional application No. 61/912,797, filed on Dec. 6, 2013.

(51) Int. Cl.
*B29C 65/48* (2006.01)
*B32B 3/30* (2006.01)
(Continued)

(52) U.S. Cl.
CPC ........ *B32B 17/10* (2013.01); *B32B 17/10036* (2013.01); *B32B 17/10247* (2013.01);
(Continued)

(58) Field of Classification Search
USPC .... 156/247, 308.2, 309.6; 428/38, 131, 134, 428/141, 156, 173, 179
See application file for complete search history.

(56) References Cited

U.S. PATENT DOCUMENTS

| 3,027,288 A | 3/1962 | Kesler |
| 3,234,062 A | 2/1966 | Morris |

(Continued)

FOREIGN PATENT DOCUMENTS

| DE | 102006042538 | 7/2011 |
| DE | 102013012648 A1 | 3/2014 |

(Continued)

OTHER PUBLICATIONS

Patent Cooperation Treaty International Notification of Transmittal of the International Search Report and The Written Opinion of the International Searching Authority, international application No. PCT/US2014/068254: dated Feb. 25, 2015, 10 pages.

*Primary Examiner* — Sing P Chan
(74) *Attorney, Agent, or Firm* — Frank Brock Riggs (57) ABSTRACT A method of cold forming a glass laminate structure. The method includes assembling a multi-layer structure having two buffer plates and a glass laminate structure intermediate the two buffer plates, wherein one or both of the two buffer plates includes a pattern formed thereon or therein or the multi-layer structure includes non-deformable materials forming a pattern. The method further includes cold forming the glass laminate structure in the autoclave by heating the assembled structure to a temperature about 5 to 10 degrees above the softening point of the polymer interlayer for a predetermined period of time at a predetermined pressure. After processing the glass laminate structure can be removed from between the buffer plates wherein the pattern formed in or on the one or both buffer plates or non-deformable
(Continued)

materials has been transferred to the glass laminate structure as a function of variances of thicknesses in the glass laminate structure.

20 Claims, 8 Drawing Sheets (51) Int. Cl.
*B32B 37/06* (2006.01)
*B32B 37/10* (2006.01)
*B32B 37/12* (2006.01)
*B32B 37/26* (2006.01)
*B32B 38/10* (2006.01)
*B44C 5/08* (2006.01)
*C03C 27/12* (2006.01)
*B32B 17/10* (2006.01)
*B44F 1/06* (2006.01)
*B44C 5/04* (2006.01)
*B32B 37/14* (2006.01)

(52) U.S. Cl.
CPC .. *B32B 17/10743* (2013.01); *B32B 17/10761* (2013.01); *B32B 17/10853* (2013.01); *B32B 17/10889* (2013.01); *B32B 37/06* (2013.01); *B32B 37/14* (2013.01); *B44C 5/0407* (2013.01); *B44F 1/066* (2013.01); *B32B 2307/30* (2013.01)

(56) References Cited

U.S. PATENT DOCUMENTS

| | | | |
|---|---|---|---|
| 3,617,336 A | | 11/1971 | Gilard et al. |
| 3,852,136 A | | 12/1974 | Plumat et al. |
| 4,341,576 A | | 7/1982 | Lewis |
| 4,385,951 A | | 5/1983 | Pressau |
| 4,398,979 A | | 8/1983 | Cathers et al. |
| 4,898,632 A | | 2/1990 | Roth et al. |
| 5,370,913 A | * | 12/1994 | Lin .................. B32B 17/10247 428/13 |
| 5,415,909 A | | 5/1995 | Shohi et al. |
| 5,449,426 A | * | 9/1995 | Lin .................. B32B 17/10036 156/101 |
| 5,506,058 A | * | 4/1996 | Ikuina .................. C03C 14/004 257/E23.009 |
| 5,536,347 A | | 7/1996 | Moran |
| 5,853,516 A | | 12/1998 | Lehto |
| 6,342,116 B1 | | 1/2002 | Balduin et al. |
| 6,726,979 B2 | * | 4/2004 | Friedman .............. B29C 59/005 428/141 |
| 6,863,956 B1 | * | 3/2005 | Nakajima ............. B29C 59/022 428/156 |
| 7,150,905 B2 | * | 12/2006 | Nakajima ............. B29C 59/022 428/156 |
| 7,232,213 B2 | | 6/2007 | Smith et al. |
| 7,378,142 B2 | * | 5/2008 | Nakajima ............. B29C 59/022 428/156 |
| 9,777,438 B2 | * | 10/2017 | Tanimoto ............... D21H 27/26 |
| 2002/0196392 A1 | * | 12/2002 | Kawano ........... G02F 1/133555 349/104 |
| 2003/0162028 A1 | * | 8/2003 | Friedman .............. B29C 59/005 428/421 |
| 2004/0018249 A1 | | 1/2004 | Trosser et al. |
| 2004/0182493 A1 | | 9/2004 | Chick |
| 2004/0191482 A1 | * | 9/2004 | Nakajima ............. B29C 59/022 428/156 |
| 2004/0231778 A1 | | 11/2004 | Teschner et al. |
| 2005/0118401 A1 | | 6/2005 | Smith et al. |
| 2005/0287341 A1 | * | 12/2005 | Nakajima ............. B29C 59/022 428/156 |
| 2007/0042160 A1 | * | 2/2007 | Nakajima ............. B29C 59/022 428/156 |
| 2008/0105371 A1 | | 5/2008 | Smith et al. |
| 2008/0210361 A1 | | 9/2008 | Bohm et al. |
| 2008/0233377 A1 | | 9/2008 | Smith et al. |
| 2008/0264558 A1 | * | 10/2008 | Hayes ..................... B32B 17/10 156/277 |
| 2010/0104837 A1 | * | 4/2010 | Tanimoto ............... D21H 27/26 428/212 |
| 2012/0094084 A1 | * | 4/2012 | Fisher .................. B32B 17/10036 428/174 |
| 2013/0280487 A1 | * | 10/2013 | Blazy .................... B32B 38/06 428/142 |

FOREIGN PATENT DOCUMENTS

| | | |
|---|---|---|
| EP | 1235683 | 8/2003 |
| GB | 2154230 | 9/1985 |
| WO | 9101880 | 2/1991 |
| WO | 03057478 A1 | 7/2003 |
| WO | 2013188489 | 12/2013 |

* cited by examiner

METHODS FOR FORMING PATTERNS IN THIN GLASS LAMINATE STRUCTURES

CROSS-REFERENCE TO RELATED APPLICATIONS

This application claims the benefit of priority under 35 U.S.C. § 365 of International Patent Application Serial No. PCT/US14/68254 filed on Dec. 3, 2014, and claims the benefit of priority of U.S. Provisional Application Ser. No. 61/912,797 filed on Dec. 6, 2013, the content of which is relied upon and incorporated herein by reference in its entirety.

BACKGROUND

Glass laminate structures can be used as windows and glazing in architectural and transportation applications, including automobiles, rolling stock, locomotives and airplanes. Glass laminate structures can also be used as glass panels in balustrades and stairs, and as decorative panels or coverings for walls, columns, elevator cabs, kitchen appliances and other applications. As used herein, a glazing or a laminated glass structure can be a transparent, semi-transparent, translucent or opaque part of a window, panel, wall, enclosure, sign or other structure. Common types of glazings that are used in architectural and/or vehicular applications can include clear and tinted glass laminate structures.

Conventionally, to form a pattern in a sheet of glass it is necessary to heat the glass above the softening point of the glass while impressing the sheet with a form or other tooling. Upon cooling, the glass retains the imparted shape or embossed surface pattern. While this hot-forming process can be an effective method of inducing shape change to a sheet of glass, the method generally requires high temperatures, typically greater than 600° C., and a large energy input. These high temperatures, however, can affect the characteristics of the glass, and the large energy inputs required of such processes can adversely affect the cost of production.

Furthermore, in instances when the glass utilized is thin, it can be difficult to prevent optical distortions in the resulting glass laminate structures due to the flexibility of the thin glass. Thus, there is a need in the industry to form patterns at lower temperatures to provide lower production costs and provide higher quality glass laminate structures.

SUMMARY

The embodiments disclosed herein generally relate to glass forming and glass laminate structures.

Some embodiments of the present disclosure provide a method of inducing a pattern in a glass laminate structure. The structure can include two layers of thin, strengthened glass and at least one layer of a thermoplastic interlayer material. The pattern can manifest itself as an induced optical distortion resulting from a change in thickness of the laminate between the area(s) of the pattern and adjacent background regions. In some embodiments, several diopters of optical power can be induced through these changes in laminate thicknesses. Additional embodiments can exploit the tendency of thin glass to deform during lamination which, in some cases, can result in optical distortions. By increasing the amount of distortion in a controlled manner, this tendency to deform can be utilized as an aesthetic improvement. Embodiments described herein can thus find utility in the area architectural laminate structures and can also find utility in other areas including, but not limited to, auto glazing, embossments, logos, and the like.

In some embodiments, a method is provided for cold forming a glass laminate structure. The method includes assembling a multi-layer structure having two buffer plates, one or more non-deformable materials adhered to a surface of one or both of the two buffer plates and a glass laminate structure intermediate the two buffer plates, wherein the glass laminate structure includes two sheets of glass and a polymer interlayer intermediate the two sheets of glass and wherein the one or more non-deformable materials form a pattern. The method further includes placing the assembled structure in an autoclave and cold forming the glass laminate structure in the autoclave by heating the assembled structure to a temperature about 5 to 10 degrees above the softening point of the polymer interlayer for a predetermined period of time at a predetermined pressure. The method also includes removing the assembled structure from the autoclave and removing the glass laminate structure from between the buffer plates and one or more non-deformable materials wherein the pattern formed by the one or more non-deformable materials has been transferred to the glass laminate structure as a function of variances in thicknesses of the glass laminate structure.

Another embodiment includes providing a method of cold forming a glass laminate structure. This method includes assembling a multi-layer structure having two buffer plates and a glass laminate structure intermediate the two buffer plates, wherein the glass laminate structure includes two sheets of glass and a polymer interlayer intermediate the two sheets of glass and wherein one or both of the two buffer plates includes a pattern formed thereon or therein. The method also includes placing the assembled structure in an autoclave and cold forming the glass laminate structure in the autoclave by heating the assembled structure to a temperature about 5 to 10 degrees above the softening point of the polymer interlayer for a predetermined period of time at a predetermined pressure. The method further includes removing the assembled structure from the autoclave and removing the glass laminate structure from between the buffer plates wherein the pattern formed in or on the one or both buffer plates has been transferred to the glass laminate structure as a function of variances of thicknesses in the glass laminate structure.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being understood, however, that the embodiments disclosed and discussed herein are not limited to the precise arrangements and instrumentalities shown.

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those of ordinary skill in the art will recognize that many modifications and adaptations of the present disclosure are possible and can even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the foregoing description of exemplary or illustrative embodiments is provided for the purpose of illustrating the principles of the present disclosure and not in limitation thereof and can include modification thereto and permutations thereof.

Embodiments of the present disclosure are generally directed to glass laminate structures including one or more glass panes. Suitable glass sheets used in embodiments of the present disclosure can be thermally strengthened or chemically-strengthened by a pre- or post-ion exchange process. In a chemical strengthening process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region. A corresponding tensile stress can be induced within a central region of the glass to balance the compressive stress. Of course, other suitable glass sheets used in embodiments of the present disclosure can be non-strengthened glass, e.g., soda lime glass, or the like.

Exemplary ion-exchangeable glasses that are suitable for forming glass sheets or glass laminate structures can be alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One exemplary glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further exemplary glass composition suitable for forming glass laminate structures comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %. A still further exemplary glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $(Li_2O+Na_2O+K_2O)$ 18 mol. % and 2 mol. % $(MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\Sigma \text{ modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO. In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. %≤$Li_2O$+$Na_2O$+$K_2O$≤20 mol. % and 0 mol. %≤MgO+CaO≤10 mol. %. In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2$+$B_2O_3$+CaO≤69 mol. %; $Na_2O$+$K_2O$+$B_2O_3$+MgO+CaO+SrO>10 mol. %; 5 mol. %≤MgO+CaO+SrO≤8 mol. %; ($Na_2O$+$B_2O_3$)–$Al_2O_3$≤2 mol. %; 2 mol. %≤$Na_2O$–$Al_2O_3$≤6 mol. %; and 4 mol. % ($Na_2O$+$K_2O$)–$Al_2O_3$≤10 mol. %.

Exemplary chemically-strengthened as well as non-chemically-strengthened glass, in some embodiments, can be batched with 0-2 mol. % of at least one fining agent selected from a group that includes $Na_2SO_4$, NaCl, NaF, NaBr, $K_2SO_4$, KCl, KF, KBr, and $SnO_2$. In one embodiment, sodium ions in chemically-strengthened glass can be replaced by potassium ions from the molten bath, though other alkali metal ions having a larger atomic radii, such as rubidium or cesium, can replace smaller alkali metal ions in the glass. According to some embodiments, smaller alkali metal ions in the glass can be replaced by $Ag^+$ ions. Similarly, other alkali metal salts such as, but not limited to, sulfates, halides, and the like may be used in the ion exchange process. The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t represents the total thickness of the glass sheet and DOL is the depth of exchange, also referred to as depth of layer.

According to various embodiments, glass sheets and/or glass laminate structures comprising ion-exchanged glass can possess an array of desired properties, including low weight, high impact resistance, and improved sound attenuation. In one embodiment, a chemically-strengthened glass sheet can have a surface compressive stress of at least 250 MPa, e.g., at least 250, 300, 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa). A modulus of elasticity of a chemically-strengthened glass sheet can range from about 60 GPa to 85 GPa (e.g., 60, 65, 70, 75, 80 or 85 GPa). The modulus of elasticity of the glass sheet(s) and the polymer interlayer can affect both the mechanical properties (e.g., deflection and strength) and the acoustic performance (e.g., transmission loss) of the resulting glass laminate structure.

Exemplary glass sheet forming methods include fusion draw and slot draw processes, which are each examples of a down-draw process, as well as float processes. These methods can be used to form both chemically-strengthened and non-chemically-strengthened glass sheets utilized in embodiments of the present disclosure. The fusion draw process generally uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because a single sheet is drawn through the slot, rather than two sheets being fused together.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an exemplary process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

As noted above, exemplary glass sheets can be used to form glass laminates or glass laminate structures. The term "thin" as used herein means a thickness of up to about 2.1 mm, up to about 1.5 mm, up to about 1.0 mm, up to about 0.7 mm, or in a range of from about 0.3 mm to about 2.1 mm, from about 0.3 mm to about 1.5 mm, from about 0.3 mm to about 1.0 mm, from about 0.3 mm to about 0.7 mm, or from about 0.5 mm to about 0.7 mm. The terms "sheet", "structure", "glass structures", "laminate structures" and "glass laminate structures" may be used interchangeably in the present disclosure and such use should not limit the scope of the claims appended herewith. The term "glass" is meant to include not only window glass, plate glass, silicate glass, sheet glass, low iron glass, and float glass, but also include colored glass, specialty glass which includes ingredients to control, for example, solar heating, coated glass with, for example, sputtered metals, such as silver or indium tin oxide, for solar control purposes, E-glass, Toroglass, Solex® (PPG Industries, Pittsburgh, Pa.) glass and the like. The glass may also include frosted or etched glass sheet. Thus, the type of glass to be selected for an exemplary glass or glass laminate structure according to embodiments of the present disclosure can depend upon the intended use.

Figure 1:
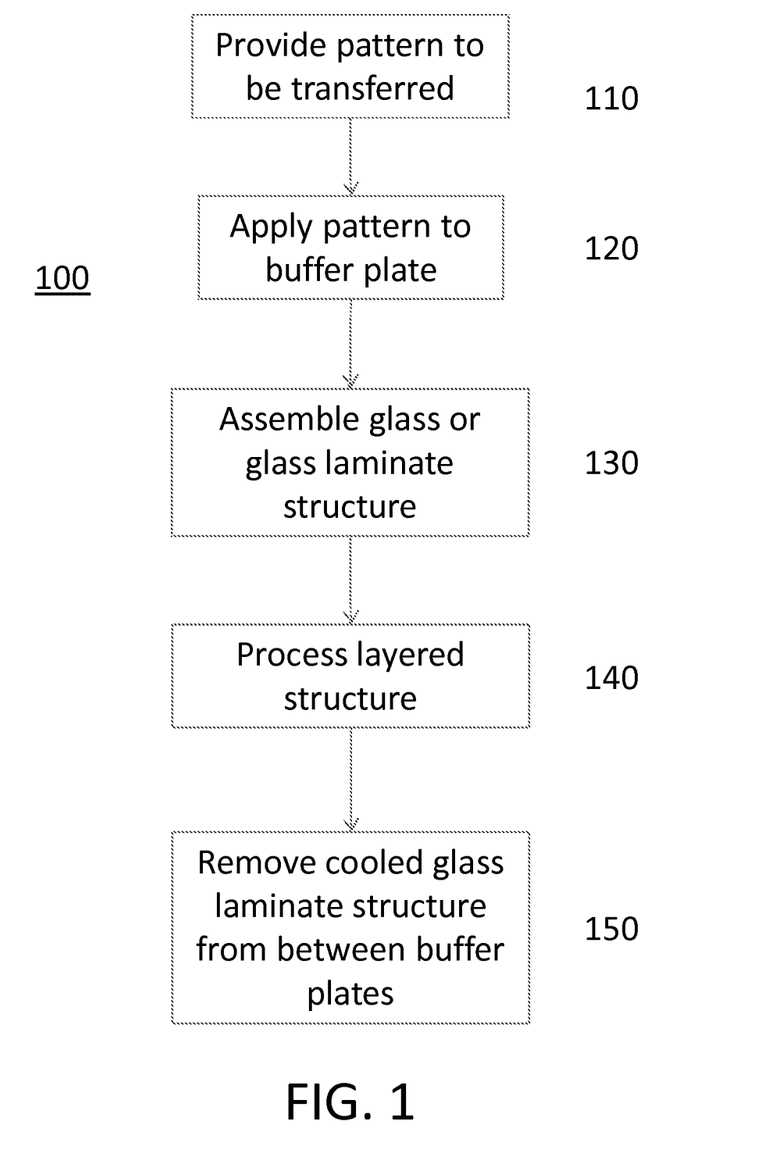
FIG. 1 is a block diagram of a method according to some embodiments of the present disclosure.
Figure 2:
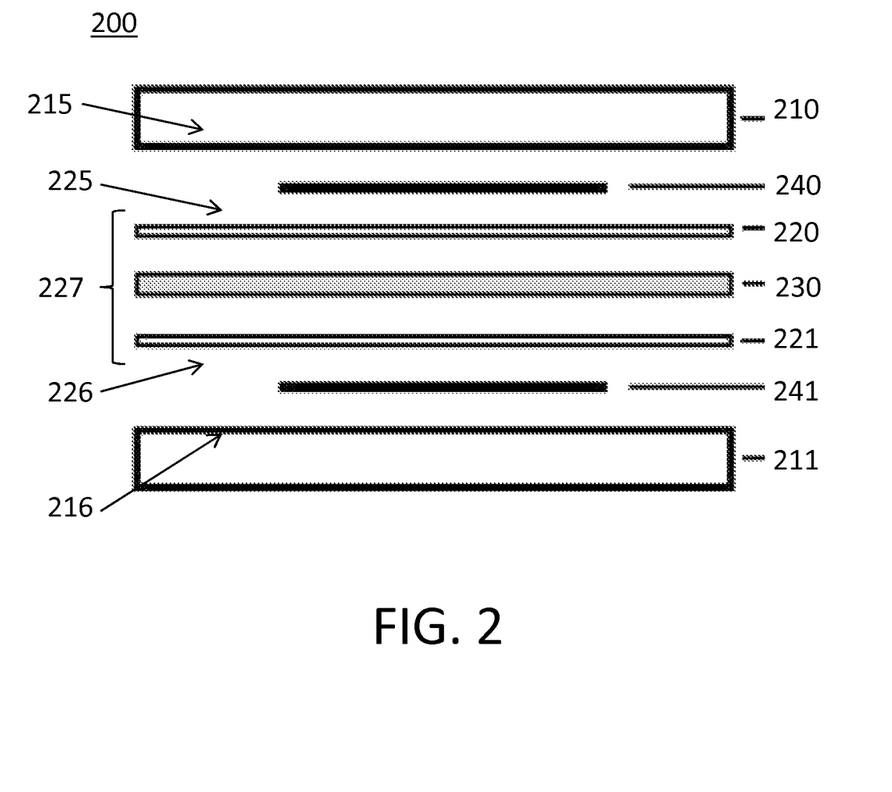
FIG. 2 is an exploded cross-sectional illustration of components utilized in a method according to some embodiments of the present disclosure.
Figure 3A:
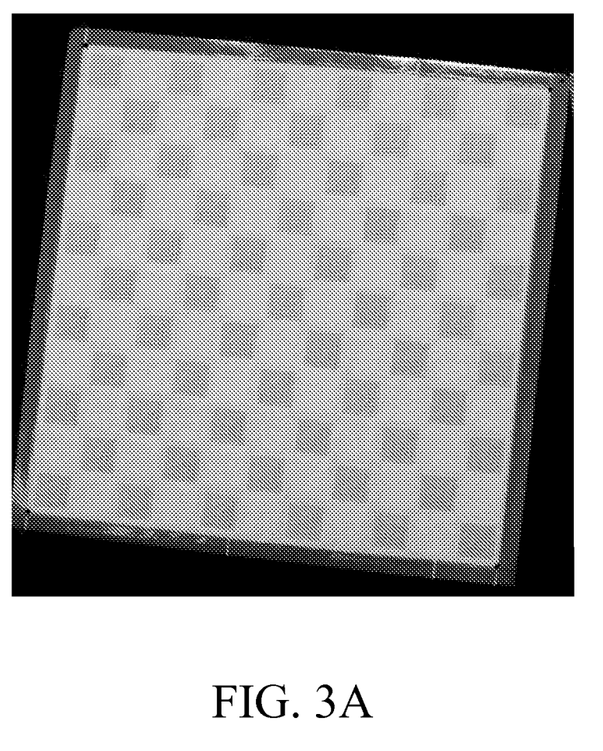
FIG. 3A is a flat plan view of a non-limiting pattern utilized in an experiment.

FIG. 1 is a block diagram of a method according to some embodiments of the present disclosure. FIG. 2 is an exploded cross-sectional illustration of components utilized in a method according to some embodiments of the present disclosure. With reference to FIGS. 1 and 2, a method 100 for cold forming a glass laminate structure can include at step 110 providing a pattern to be transferred to a glass laminate structure. This pattern can be in the form of one or more temperature resistant, non-deformable materials 240, 241 provided adjacent to or applied on one or more buffer plates 210, 211 as shown in FIG. 2. In another embodiment, this pattern can be provided by the buffer plates themselves. FIG. 3 is a flat plan view of a non-limiting pattern 300 utilized in one experiment. At step 120, the pattern(s) can be applied to an interior-facing surface 215, 216 of the buffer plate(s) 210, 211. In some embodiments, the pattern(s) can be applied to the surface of a soda-lime glass sheet acting as the buffer plate(s) 210, 211 that will face or will be in contact with an opposing surface 225, 226 of a thin glass sheet 220, 221, respectively, or glass laminate structure 227. Of course, buffer plates comprised of other materials (e.g., metals, different glasses, etc.) are envisioned, and the aforementioned example should not limit the scope of the claims appended herewith. For example, metal or ceramic plates can be utilized as a buffer plate and adhesives and primers can be employed to enhance bond strength between buffer plate and adjacent non-deformable materials 240, 241. In embodiments where two patterns are utilized, the patterns should be aligned such that they substantially overlay each other (if the patterns are the same), or the patterns should be aligned such that they form a final desired pattern. In some embodiments, multiple layers of patterns can be utilized to control the final optical distortions induced in an exemplary glass or glass laminate structure. These patterns can be applied to any one or both of the buffer plates 210, 211 depicted in FIG. 2.

At step 130, an exemplary glass laminate structure 227 and layered assembly or structure 200 can be assembled. In one embodiment, the laminate structure 227 can include the layers 220, 221, 230 depicted in FIG. 2. In another embodiment, the laminate structure 227 can include additional glass sheets and/or polymer interlayers or a single glass sheet rather than the laminate structure 227 depicted in FIG. 2. In some embodiments, step 130 can include forming a glass laminate structure having first and second glass layers 220, 221 and an intermediate polymer interlayer 230. Any one or both of these first and second glass layers 220, 221 can be strengthened (e.g., thermally strengthened, chemically strengthened, etc.) or can be non-strengthened glass. In step 130, the layers of the assembly 200 can also be secured to prevent shifting during subsequent processing. Because of the high flexibility of thin glass, it can be difficult to prevent induced optical distortion when making laminate structures. To prevent any undesirable induced distortion, additional flat or shaped, stiff buffer plates can be employed during subsequent processing (e.g., vacuum bag autoclave processes, etc.). In other embodiments, a two-step process including a separate de-air and tack step with the part contained in a vacuum bag, followed by an autoclave cycle with no vacuum, can be employed.

In step 140, the layered structure can then be processed (e.g., autoclaved, etc.) at the desired conditions. For example, in a non-limiting experiment, DuPont SentryGlas was utilized as the polymer interlayer 230 and the assembly 200 was processed in an autoclave with a vacuum of about −0.9 bar, a soak temperature of about 135° C., a pressure of about 80 psi, and a soak time of about 60 minutes. Temperature decrease upon completion of the processing was at a rate of 4° F. or greater. In step 150, the cooled glass laminate structure can be removed from between the buffer plates 210, 211 and non-deformable materials 240, 241, as applicable, that were utilized to emboss the glass laminate structure 227. In some embodiments, the glass laminate structure can then be cleaned, edge trimmed, etc.

With continued reference to FIG. 2, an exemplary glass laminate structure 227 can include one or a plurality of glass sheets 220, 221 with a polymer interlayer(s) 230 intermediate the glass sheets 220, 221. In some embodiments, a thermoplastic material such as, but not limited to, PVB can be utilized as the polymer interlayer 230. This polymer interlayer 230 can, in certain embodiments, have a thickness of at least about 0.125 mm (e.g., 0.125, 0.25, 0.38, 0.5, 0.7, 0.76, 0.81, 1, 1.14, 1.19, 1.2, 1.52 mm) The polymer interlayer 230 can have a thickness of less than or equal to about 1.6 mm (e.g., from 0.4 to 1.2 mm, such as about 0.4, 0.5, 0.6, 0.7, 0.8, 0.9, 1.0, 1.1, 1.2, or 1.52 mm) The polymer interlayer 230 can cover most or substantially all of the two opposed major faces of the glass sheets 220, 221 and, in some embodiments, can also include a peripheral portion having the same or different polymeric material with a higher modulus of elasticity to edge strengthen the perimeter of the glass laminate structure 227. Thus, the polymer interlayer can comprise a monolithic polymer sheet, a multilayer polymer sheet, or a composite polymer sheet (i.e., a polymer sheet(s) having regions of varying modulus of elasticity). The glass sheets in contact with the polymer interlayer can be heated above the softening point thereof, such as, for example, at least 5° C. or 10° C. above the softening point, to promote bonding of the polymeric material(s) to the respective glass sheets. The heating can be performed with the glass in contact with the polymeric interlayers under pressure. One or more polymer interlayers can be incorporated into an exemplary glass laminate structure. A plurality of interlayers can provide complimentary or distinct functionality, including adhesion promotion, acoustic control, UV transmission control, tinting, coloration and/or IR transmission control. In some embodiments, the glass laminate structures can also include additional layers, such as other interlayer sheets and polymeric films. These additional layers or polymeric films can provide additional attributes, such as acoustic barriers, added penetration resistance, stiffness, and solar control, to name a few. In some embodiments, the additional layers or polymeric films can be poly(ethylene terephthalate) or ionomer sheets and can include functional coatings applied thereto such as, but not limited to, organic infrared absorbers and sputtered metal layers, e.g., silver, copper, and the like. Adhesives or primers can also be included to provide adhesion between the polymeric layers and the interlayer.

The interlayer or composite interlayer can have a thickness ranging from about 0.40 mm to about 2.3 mm or greater whereby the thicknesses of sheets in the multiple layer interlayer can vary. Any one or several of the polymer interlayers or sheets can be blank, bear printed images or colors, transparent, semi-transparent, opaque or can otherwise be visually distinct from the adjacent glass sheets or panes. Of course, the interlayer materials can be thermoplastic materials such as, but are not limited to, an ethylene copolymer and/or terpolymer such as ethylene/acrylic acid or ethylene/alkyl acrylate copolymers and ethylene/acrylic acid/alkyl acrylate terpolymers, a polyacetal, a polyvinylbutyral (PVB), a polyurethane, a polyvinyl chloride, or a polyester. Additional polymeric materials can include thermosetting polymeric materials such as, but not limited to, polyurethanes, vulcanized rubber, Bakelite, polyester materials, ionomers (SentryGlass) phenol-formaldehyde materials, urea-formaldehyde materials, epoxy resins, polyimides, melamine resins, esters, polycyanurates, Duroplast and other suitable esters, resins, epoxies, cross-linked polymers and/or reinforced polymeric materials. Further polymeric materials include polycarbonate, acoustic PVB, ethylene vinyl acetate (EVA), thermoplastic polyurethane (TPU), 2-part epoxies, 2-part urethanes, 2-part acrylics, 2-part silicones, moisture cured urethanes and epoxies, phenolics, novolacs, melamine formaldehydes, alkyds, unsaturated polyesters, polyamides, photo or electron beam curable polymers, and combinations thereof.

In some embodiments, the glass laminate structure can include one or more rigid or semi-rigid sheet layers such as, but not limited to, glass or rigid transparent plastic sheets, polycarbonate, acrylics, polyacrylate, poly(methyl methacrylate), cyclic polyolefins, such as ethylene norbornene polymers, polystyrene (preferably metallocene-catalyzed), and the like, and combinations thereof.

The polymer interlayer 230 can be in direct physical contact (e.g., laminated to) each of the respective glass sheets 220, 221. As described above and illustrated in FIG. 1, the buffer plates 210, 211 can each be in contact with portions of the non-deformable material 240, 241 and/or portions of respective internal glass sheets 220, 221. Any one, both or none of the buffer plates 210, 211 and glass sheets 220, 221 can be chemically-strengthened glass or non-chemically-strengthened glass. In some embodiments, a glass laminate structure can comprise two chemically-strengthened glass sheets 220, 221, one chemically-strengthened glass sheet 220 and an opposing non-chemically strengthened glass sheet 221, or two non-chemically-strengthened glass sheets 220, 221, each having one or more intermediate polymer interlayer(s) 230.

Figure 3B:
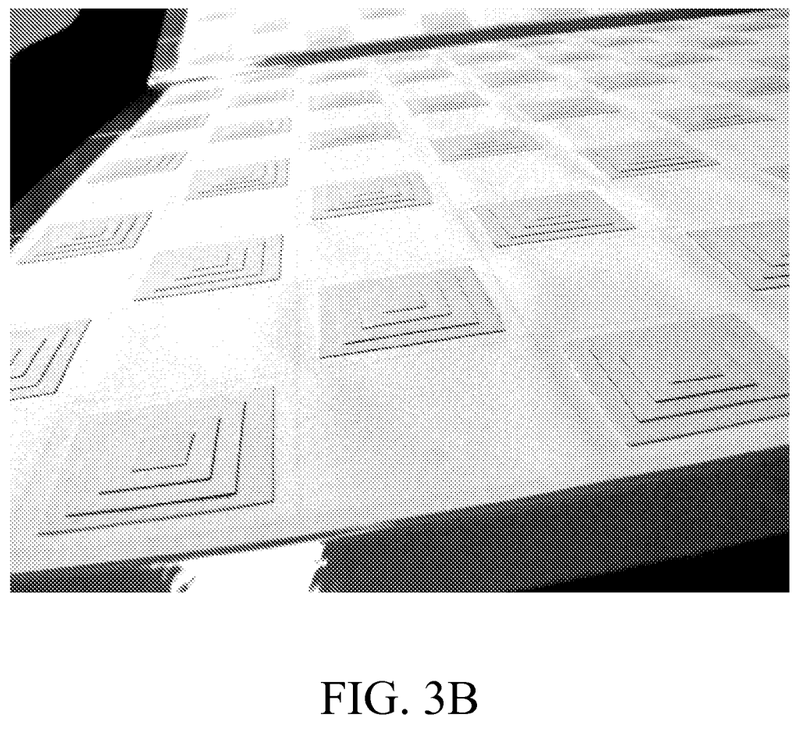
FIG. 3B is a perspective view of the pattern shown in FIG. 3A.
Figure 4:
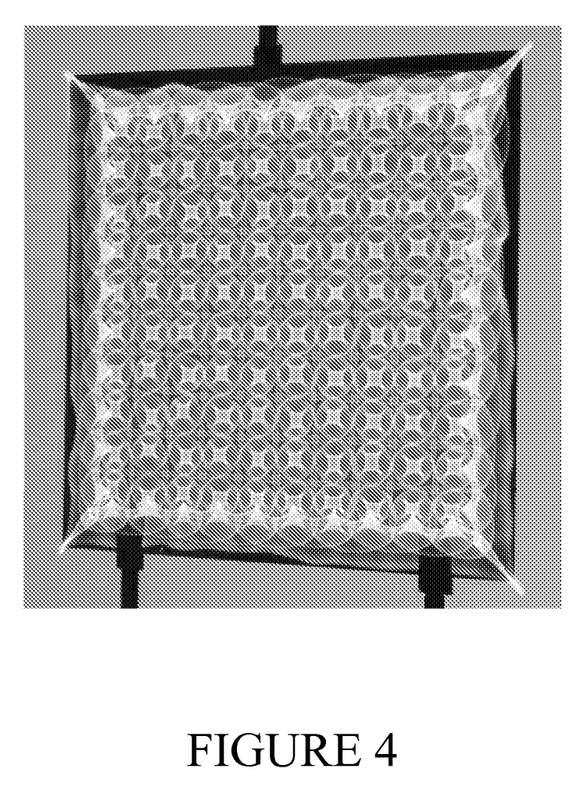
FIG. 4 is a point source image of a cold-formed logo utilized in an experiment.
Figure 5:
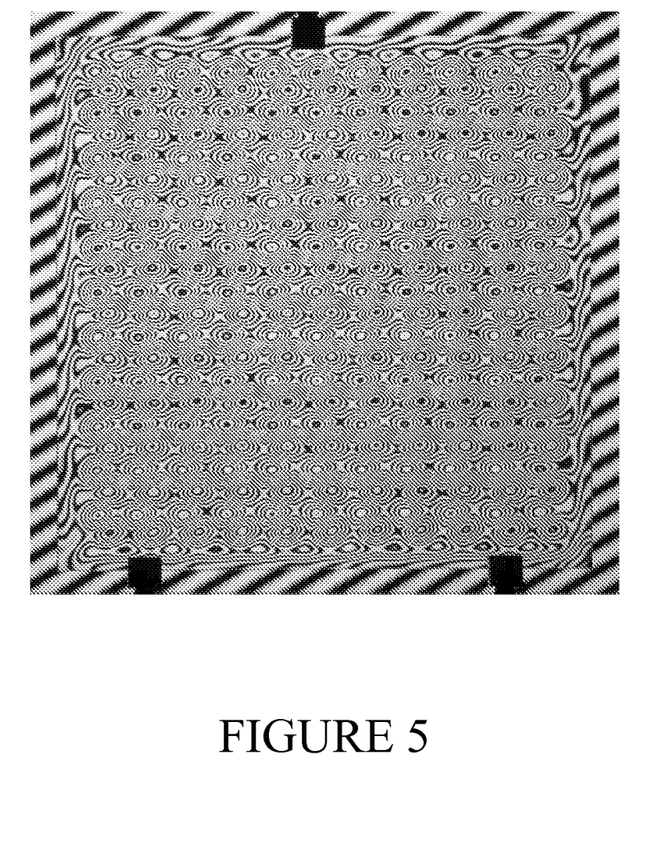
FIG. 5 is a zebra board distortion image of a cold-formed logo utilized in an experiment.
Figure 6A:
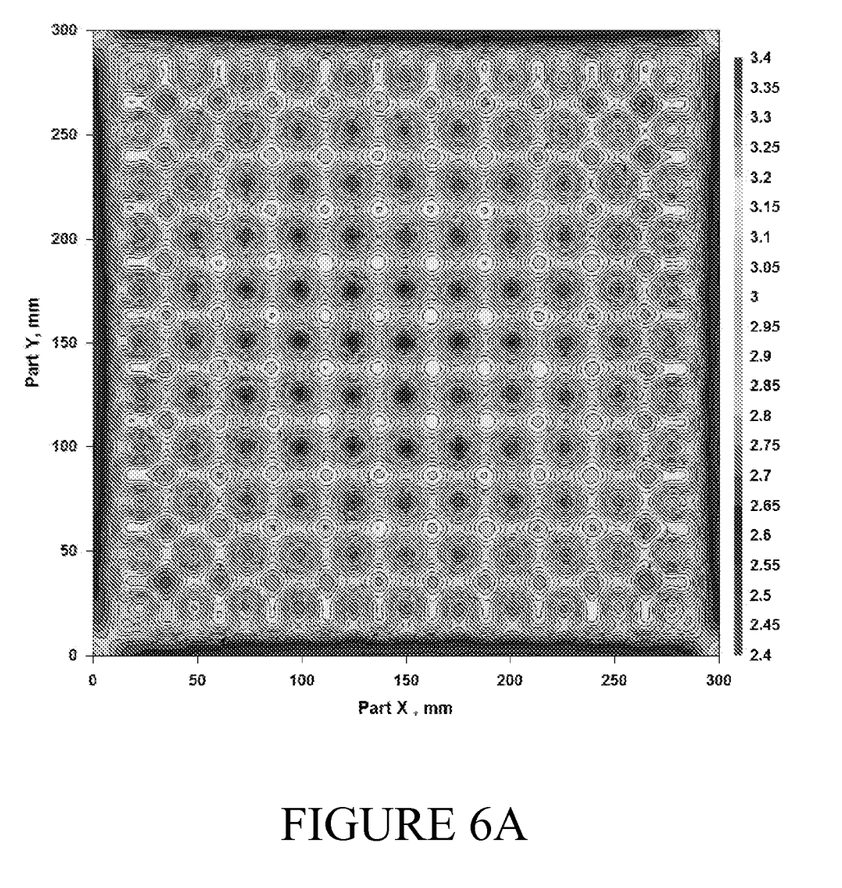
FIG. 6A is a thickness map of the cold-formed glass laminate structure depicted in FIGS. 4 and 5.
Figure 6B:
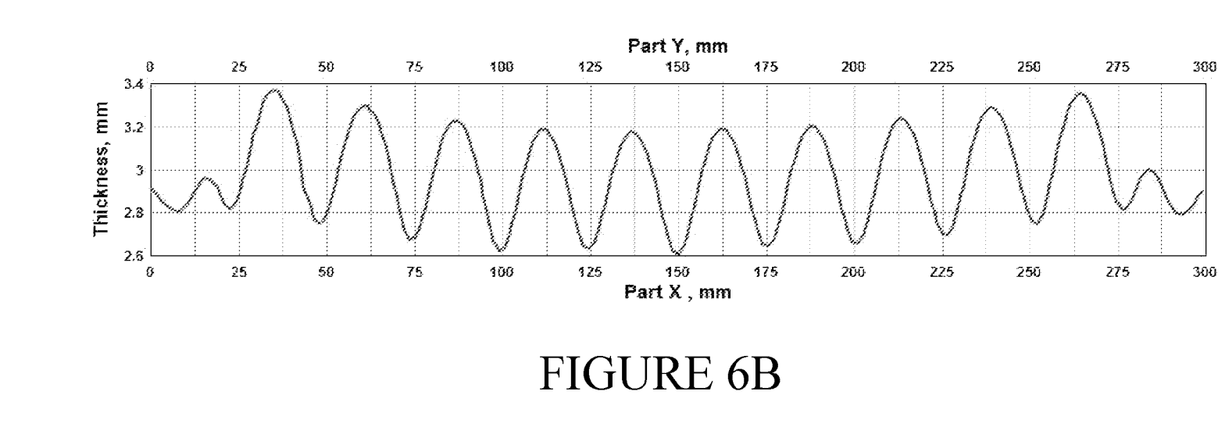
FIGS. 6B and 6C are thickness profiles of the cold-formed glass laminate structure depicted in FIGS. 4 and 5.
Figure 6C:
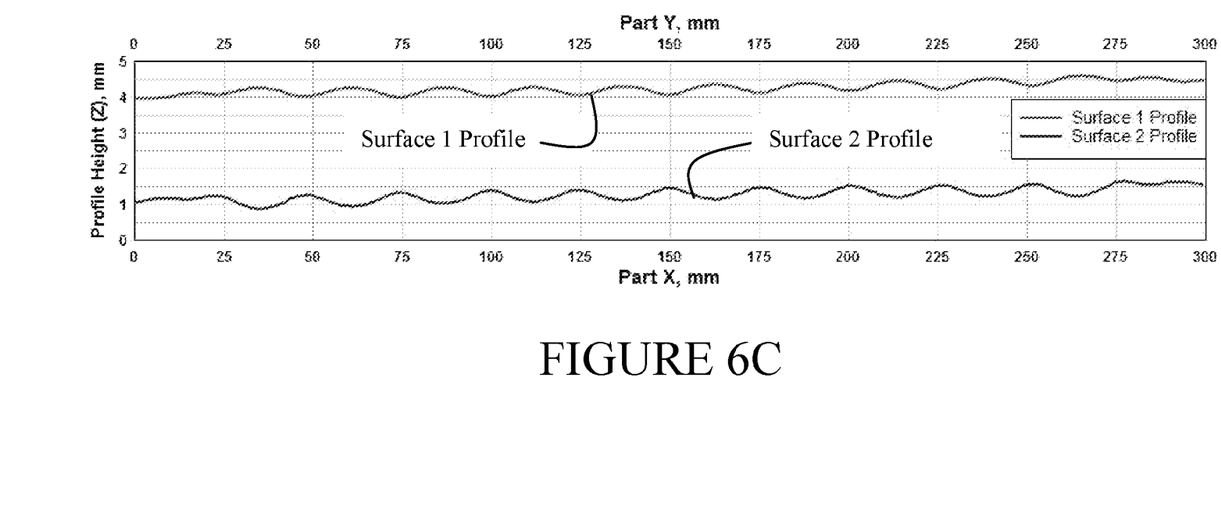

In one non-limiting embodiment, two soda lime glass sheets can be employed as buffer plates 210, 211 each having a thickness from about 4 mm to about 6 mm that are rigid enough not to deform during subsequent processing (e.g., autoclaving). Adjacent the soda lime glass sheets 210, 211 are non-deformable materials 240, 241, e.g., shims, etc., having a substantially uniform thickness which can be utilized to induce deformation in adjacent thin glass or thin glass laminate structures 227. In one non-limiting experiment, the shim material was card stock paper with a sinusoidal repeating pattern (FIGS. 3A and 3B). As shown in FIG. 3B, the thickness varies to provide a repeating sinusoidal pattern. Of course, such an example should not limit the scope of the claims appended herewith as the non-deformable material can be a metal, ceramic or other material. In some embodiments, the buffer plate(s) itself includes the pattern and the additional non-deformable material can be eliminated. In contact with the non-deformable material(s) 240, 241 can be one or more sheets of glass 220 or a glass laminate structure 227 having two glass sheets 220, 221 and an intermediate polymer interlayer 230. In one non-limiting experiment, the two glass sheets 220, 221 were chemically-strengthened glass having a thickness of about 0.7 mm and the polymer interlayer 230 was DuPont SentryGlas having a thickness of about 1.52 mm. Of course, different types and thicknesses of glass and/or interlayer materials can be utilized in embodiments of the present disclosure and such an example should not limit the scope of the claims appended herewith. FIG. 4 is a point source image of a cold-formed sinusoidal pattern utilized in the aforementioned experiment. FIG. 5 is a zebra board distortion image of a cold-formed sinusoidal pattern utilized in the aforementioned experiment. With reference to FIGS. 4 and 5, it can be observed that a cold-formed glass laminate structure 227 utilizing the sinusoidal pattern of FIG. 3 and embossed as described above resulted in a transparent laminate structure having an optically transparent pattern formed therein. FIG. 6A is a thickness map and FIGS. 6B and 6C are thickness profiles of the cold-formed glass laminate structure depicted in FIGS. 4 and 5. With reference to FIGS. 6A-6C, the variances in the thickness of the cold formed laminate structure 227 can be observed whereby these cold-formed variances are utilized to form the optical pattern in the laminate structure. FIG. 6C illustrates the profiles of the exterior surfaces 225, 226 of the glass laminate structure 227. As observed in FIGS. 4, 5, and 6A-6C, a desired pattern can manifest itself as an induced optical distortion resulting from changes in thickness of the glass or glass laminate structure between the area(s) of the pattern and adjacent background regions. In some embodiments, several diopters of optical power can be induced through these changes in thicknesses. Embodiments described herein can thus exploit the tendency of thin glass to deform during lamination processes which, in some cases, can result in optical distortions. By increasing the amount of distortion in a controlled manner, this tendency to deform can be utilized as an aesthetic improvement to glass or glass laminate structures. Glass laminate structures 227 according to embodiments of the present disclosure can also be adapted to provide an optically transparent barrier in architectural and automotive openings, e.g., automotive glazings.

Exemplary glass laminate structures can be formed using a variety of processes. An assembly of a laminated structure 227, in some embodiments, can involve laying down a first sheet of glass, overlaying a polymer interlayer(s) on the first sheet, laying down a second sheet of glass, and then trimming the excess PVB to the edges of the glass sheets. A tacking step can include expelling most of the air from the interfaces and partially bonding the PVB to the glass sheets. The finishing step, typically carried out at elevated temperature and pressure, completes the mating of each of the glass sheets to the polymer interlayer(s). As discussed above, the glass laminate structures disclosed herein can be configured to include one or more chemically-strengthened glass panes and/or non-chemically-strengthened glass panes.

Exemplary glass and glass laminate structures can also be produced through autoclave and non-autoclave processes. For example, in a typical autoclave process, a laminate stack (i.e., the glass sheets and any interlayers) can be laminated together under heat and pressure and a vacuum (for example, in the range of about 27-28 inches Hg (689-711 mm)), to remove air. In some embodiments, an assembly 200 (FIG. 2) can be placed in an autoclave whereby the pattern formed by the non-deformable material(s) 240, 241 or a pattern formed in/on the buffer plate can be cold formed in the laminate stack 227 during the autoclaving process. Generally, the glass sheet utilized in embodiments of the present disclosure have been washed and dried. In a typical procedure utilizing a full assembly 200, glass sheets 220, 221 and intermediate interlayer 230 are positioned between the buffer plates 210, 211 and non-deformable material(s) 240, 241. This assembly 200 can be placed into a bag capable of sustaining a vacuum (i.e., a vacuum bag) and the air drawn out of the bag using a vacuum line or other means of pulling a vacuum on the bag. The bag is then sealed while maintaining the vacuum and placed in an autoclave at a temperature of about 130° C. to about 180° C. (e.g., about 5 to 10 degrees above the softening point of the respective interlayer) and a pressure ranging from about 150 psi to about 250 psi or lower for a predetermined period of time. In some embodiments, a vacuum ring can be substituted for the vacuum bag. Of course, other processes can be employed to produce a glass laminate structure. Such exemplary non-autoclave processes include, but are not limited to, those described in U.S. Pat. No. 3,234,062, U.S. Pat. No. 3,852,136, U.S. Pat. No. 4,341,576, U.S. Pat. No. 4,385,951, U.S. Pat. No. 4,398,979, U.S. Pat. No. 5,536,347, U.S. Pat. No. 5,853,516, U.S. Pat. No. 6,342,116, U.S. Pat. No. 5,415,909, US 2004/0182493, EP 1 235 683 B1, WO 91/01880 and WO 03/057478 A1, the entirety of each being incorporated herein by reference. Generally, these non-autoclave processes include heating an assembly and the application of vacuum, pressure or both.

In embodiments where soda-lime glass is used as a non-chemically-strengthened glass sheet in a laminate stack, conventional decorating materials and methods (e.g., glass frit enamels and screen printing) can also be used, which can simplify the glass laminate manufacturing process. Tinted soda-lime glass sheets can be incorporated into a glass laminate structure to achieve desired transmission and/or attenuation across the electromagnetic spectrum.

Glass laminate structures as described herein can thus provide beneficial effects, including the attenuation of acoustic noise, reduction of UV and/or IR light transmission, increased edge strength, and/or enhancement of the aesthetic appeal of a window or other opening. The individual glass sheets comprising the disclosed glass laminate structures, as well as the formed laminate structures, can be characterized by one or more attributes, including composition, density, thickness, surface metrology, as well as various properties including optical, sound-attenuation, and mechanical properties such as impact resistance.

Exemplary glass laminate structures can be adapted for use, for example, as windows or glazings, and configured to any suitable size and dimension. In embodiments, the glass laminate structures have a length and width that independently vary from 10 cm to 1 m or more (e.g., 0.1, 0.2, 0.5, 1, 2, or 5 m). Independently, the glass laminate structures can have an area of greater than 0.1 m$^2$, e.g., greater than 0.1, 0.2, 0.5, 1, 2, 5, 10, or 25 m$^2$. The glass laminate structures can be substantially flat or shaped for certain applications. For instance, the glass laminate structures can be formed as bent or shaped parts. In embodiments where the glass laminate structure is shaped or bent, bent or shaped buffer plates 210, 211 and non-deformable materials 240, 241 can be employed. The structure of an exemplary shaped glass or glass laminate structure can be simple or complex. In certain embodiments, a shaped glass or glass laminate structure can have a complex curvature where the glass sheets have a distinct radius of curvature in two independent directions. Such shaped glass sheets can thus be characterized as having "cross curvature," where the glass is curved along an axis that is parallel to a given dimension and also curved along an axis that is perpendicular to the same dimension. An automobile sunroof, for example, typically measures about 0.5 m by 1.0 m and has a radius of curvature of 2 to 2.5 m along the minor axis, and a radius of curvature of 4 to 5 m along the major axis. Shaped glass laminate structures according to certain embodiments can be defined by a bend factor, where the bend factor for a given part is equal to the radius of curvature along a given axis divided by the length of that axis. Thus, for the exemplary automotive sunroof having radii of curvature of 2 m and 4 m along respective axes of 0.5 m and 1.0 m, the bend factor along each axis is 4. Shaped glass laminates can have a bend factor ranging from 2 to 8 (e.g., 2, 3, 4, 5, 6, 7, or 8).

Exemplary glass laminate structures can be used in any application where non-decorative laminated glass is used (e.g., safety glass, automotive glazings, etc.). Exemplary glass laminate structures can also be used as decorative articles such as picture windows, decorative countertops, graphic art, image-bearing store-front windows, displays bearing company logos, advertising media, and/or any other use wherein a transparent laminate structure having an image can be desirable. Laminate structures as described herein can be useful as an architectural structural element in various architectural applications such as, for example, glazing, structural supports, walls, stairs, balustrades, partitions, floors, ceilings, and doors. Utility can also be found in any manner of transportation vehicle (air, rail, wheel, water, etc.). In such vehicles, exemplary laminate structures can be useful as windshields, side windows, external or internal light covers, body panels, flooring, roofing such as sunroofs/moonroofs, instrument panel covers, and the like. Of course, exemplary laminate structures can find utility in furniture, picture frames, signage, billboards, storefront windows, as artwork, as decorative accessories to rooms or offices, etc. Thus, exemplary laminate structures can be useful in most if not all applications where glass and/or glass laminate structures are employed and can be desirable due to the functional use of the images displayed or observed in the structure.

Further, the introduction of thin, chemically strengthened glass offers a new opportunity for producing low temperature formed laminates due to the flexibility, strength, and damage resistance of such glass and glass laminate structures containing such glass. By taking advantage of the susceptibility of thin glass to deform under pressure and using a thermoplastic interlayer material that is semi-rigid at normal temperatures, a pattern can be cold-formed in a thin glass laminate structure which can be permanently retained in the structure. Exemplary thin, chemically strengthened glass, such as Corning Gorilla Glass, can have a recognizable pattern permanently embossed into a laminate made therefrom with a cold-forming process describe above. Such a process can employ the relatively low temperatures and pressures of an autoclave process versus the relatively high temperatures of a traditional glass forming process. The induced optical distortion pattern in some embodiment can thus be a byproduct of a lamination process whereby the resulting laminate structure retains the structural properties and strength of the chemically-strengthened glass from which it is made.

In some embodiments, a method is provided for cold forming a glass laminate structure. The method includes assembling a multi-layer structure having two buffer plates, one or more non-deformable materials adhered to a surface of one or both of the two buffer plates and a glass laminate structure intermediate the two buffer plates, wherein the glass laminate structure includes two sheets of glass and a polymer interlayer intermediate the two sheets of glass and wherein the one or more non-deformable materials form a pattern. The method further includes placing the assembled structure in an autoclave and cold forming the glass laminate structure in the autoclave by heating the assembled structure to a temperature about 5 to 10 degrees above the softening point of the polymer interlayer for a predetermined period of time at a predetermined pressure. The method also includes removing the assembled structure from the autoclave and removing the glass laminate structure from between the buffer plates and one or more non-deformable materials wherein the pattern formed by the one or more non-deformable materials has been transferred to the glass laminate structure as a function of variances in thicknesses of the glass laminate structure. In some embodiments, the buffer plates can be curved and the removed glass laminate structure can include both the pattern formed by the one or more non-deformable materials and the curvature of the buffer plates. In other embodiments, one or both of the glass sheets can be chemically-strengthened glass or non-chemically strengthened glass. Exemplary thicknesses of the first and second glass sheets can be, but are not limited to, a thickness not exceeding about 2.1 mm, a thickness not exceeding about 1.5 mm, a thickness not exceeding about 1.0 mm, a thickness not exceeding about 0.7 mm, a thickness not exceeding about 0.5 mm, a thickness within a range from about 0.3 to about 2.1 mm, from about 0.3 mm to about 1.0 mm, a thickness from about 0.3 mm to about 0.7 mm, and a thickness from about 0.5 mm to about 0.7 mm. In some embodiments, the thicknesses of the first and second glass sheets can be different and/or the composition of the first and second glass sheets can be different. Exemplary polymer interlayer materials can be, but are not limited to, poly vinyl butyral (PVB), polycarbonate, acoustic PVB, ethylene vinyl acetate (EVA), thermoplastic polyurethane (TPU), ionomer, a thermoplastic material, polyurethanes, vulcanized rubber, polyester materials, ionomers, phenol-formaldehydes, urea-formaldehydes, epoxy resins, polyimides, melamine resins, esters, polycyanurates, esters, resins, epoxies, cross-linked polymers, reinforced polymeric materials, 2-part epoxies, 2-part urethanes, 2-part acrylics, 2-part silicones, moisture cure urethanes and epoxies, phenb olics, novolacs, melamine formaldehydes, alkyds, unsaturated polyesters, polyimides, polyamides, photo or electron beam curable polymers, and combinations thereof. In some embodiments, each of the two buffer plates comprise a material selected from the group consisting of glass, soda lime glass, strengthened glass, ceramic, metal, and combinations thereof. In another embodiment, the method can include placing the assembled structure in a vacuum bag or vacuum ring at a predetermined vacuum, and soaking the assembled structure at a temperature about 5 to 10 degrees above the softening point of the interlayer for a soak time of between 30 minutes to 200 minutes and at a pressure between 30 psi and 200 psi. These pressures and times are, of course, exemplary and should not limit the scope of the claims appended herewith. In another embodiment, the glass laminate structure can have an area greater than 1 $m^2$. In some embodiments, the assembly further comprises two or more non-deformable materials, wherein patterns of at least two of the two or more non-deformable materials are different and the pattern transferred to the glass laminate structure is a combination of the patterns of the two or more non-deformable materials.

Another embodiment includes providing a method of cold forming a glass laminate structure. This method includes assembling a multi-layer structure having two buffer plates and a glass laminate structure intermediate the two buffer plates, wherein the glass laminate structure includes two sheets of glass and a polymer interlayer intermediate the two sheets of glass and wherein one or both of the two buffer plates includes a pattern formed thereon or therein. The method also includes placing the assembled structure in an autoclave and cold forming the glass laminate structure in the autoclave by heating the assembled structure to a temperature about 5 to 10 degrees above the softening point of the polymer interlayer for a predetermined period of time at a predetermined pressure. The method further includes removing the assembled structure from the autoclave and removing the glass laminate structure from between the buffer plates wherein the pattern formed in or on the one or both buffer plates has been transferred to the glass laminate structure as a function of variances of thicknesses in the glass laminate structure. In some embodiments, the buffer plates can be curved and the removed glass laminate structure can include both the pattern formed by the one or both buffer places and the curvature of the buffer plates. In other embodiments, one or both of the glass sheets can be chemically-strengthened glass or non-chemically strengthened glass. Exemplary thicknesses of the first and second glass sheets can be, but are not limited to, a thickness not exceeding about 2.1 mm, a thickness not exceeding about 1.5 mm, a thickness not exceeding about 1.0 mm, a thickness not exceeding about 0.7 mm, a thickness not exceeding about 0.5 mm, a thickness within a range from about 0.3 to about 2.1 mm, from about 0.3 mm to about 1.0 mm, a thickness from about 0.3 mm to about 0.7 mm, and a thickness from about 0.5 mm to about 0.7 mm. In some embodiments, the thicknesses of the first and second glass sheets can be different and/or the composition of the first and second glass sheets can be different. Exemplary polymer interlayer materials can be, but are not limited to, poly vinyl butyral (PVB), polycarbonate, acoustic PVB, ethylene vinyl acetate (EVA), thermoplastic polyurethane (TPU), ionomer, a thermoplastic material, polyurethanes, vulcanized rubber, polyester materials, ionomers, phenol-formaldehydes, urea-formaldehydes, epoxy resins, polyimides, melamine resins, esters, polycyanurates, esters, resins, epoxies, cross-linked polymers, reinforced polymeric materials, 2-part epoxies, 2-part urethanes, 2-part acrylics, 2-part silicones, moisture cure urethanes and epoxies, phenb olics, novolacs, melamine formaldehydes, alkyds, unsaturated polyesters, polyimides, polyamides, photo or electron beam curable polymers, and combinations thereof. In some embodiments, each of the two buffer plates comprise a material selected from the group consisting of glass, soda lime glass, strengthened glass, ceramic, metal, and combinations thereof. In another embodiment, the method can include placing the assembled structure in a vacuum bag or vacuum ring at a predetermined vacuum, and soaking the assembled structure at a temperature about 5 to 10 degrees above the softening point of the interlayer for a soak time of between 30 minutes to 200 minutes and at a pressure between 30 psi and 200 psi. These pressures and times are, of course, exemplary and should not limit the scope of the claims appended herewith. In another embodiment, the glass laminate structure can have an area greater than 1 $m^2$. In some embodiments, pattern of the two buffer plates can be different and he pattern transferred to the glass laminate structure can be a combination of the patterns of the two buffer plates.

While this description can include many specifics, these should not be construed as limitations on the scope thereof, but rather as descriptions of features that can be specific to particular embodiments. Certain features that have been heretofore described in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and can even be initially claimed as such, one or more features from a claimed combination can in some cases be excised from the combination, and the claimed combination can be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing can be advantageous.

As shown by the various configurations and embodiments illustrated in FIGS. 1-6C, various embodiments for thin glass laminate structures and methods for forming patterns in such structures have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

I claim:

1. A method of cold forming a glass laminate structure comprising the steps of:
    assembling a multi-layer structure having two buffer plates, one or more non-deformable materials adhered to a surface of one or both of the two buffer plates and a glass laminate structure intermediate the two buffer plates, wherein the glass laminate structure includes two sheets of glass and a polymer interlayer intermediate the two sheets of glass and wherein the one or more non-deformable materials form a pattern;
    placing the assembled structure in an autoclave;
    cold forming the glass laminate structure in the autoclave by heating the assembled structure to a temperature about 5 to 10 degrees above the softening point of the polymer interlayer for a predetermined period of time at a predetermined pressure;
    removing the assembled structure from the autoclave; and
    removing the glass laminate structure from between the buffer plates and one or more non-deformable materials wherein the pattern formed by the one or more non-deformable materials has been transferred to the glass laminate structure as a function of variances in thicknesses of the glass laminate structure.

2. The method of claim 1 wherein the buffer plates are curved and the removed glass laminate structure includes both the pattern formed by the one or more non-deformable materials and the curvature of the buffer plates.

3. The method of claim 1 wherein one or both of the glass sheets is chemically-strengthened glass.

4. The method of claim 1 wherein the thicknesses of the first and second glass sheets are selected from the group consisting of a thickness not exceeding about 2.1 mm, a thickness not exceeding about 1.5 mm, a thickness not exceeding about 1.0 mm, a thickness not exceeding about 0.7 mm, a thickness not exceeding about 0.5 mm, a thickness within a range from about 0.3 to about 2.1 mm, from about 0.3 mm to about 1.0 mm, a thickness from about 0.3 mm to about 0.7 mm, and a thickness from about 0.5 mm to about 0.7 mm.

5. The method of claim 1 wherein the thicknesses of the first and second glass sheets are different.

6. The method of claim 1 wherein the composition of the first and second glass sheets are different.

7. The method of claim 1 wherein the polymer interlayer comprises a material selected from the group consisting of poly vinyl butyral (PVB), polycarbonate, acoustic PVB, ethylene vinyl acetate (EVA), thermoplastic polyurethane (TPU), ionomer, a thermoplastic material, polyurethanes, vulcanized rubber, polyester materials, ionomers, phenol-formaldehydes, urea-formaldehydes, epoxy resins, polyimides, melamine resins, esters, polycyanurates, esters, resins, epoxies, cross-linked polymers, reinforced polymeric materials, 2-part epoxies, 2-part urethanes, 2-part acrylics, 2-part silicones, moisture cure urethanes and epoxies, phenb olics, novolacs, melamine formaldehydes, alkyds, unsaturated polyesters, polyimides, polyamides, photo or electron beam curable polymers, and combinations thereof.

8. The method of claim 1 wherein each of the two buffer plates comprise a material selected from the group consisting of glass, soda lime glass, strengthened glass, ceramic, metal, and combinations thereof.

9. The method of claim 1 wherein the step of cold forming further comprises:
    placing the assembled structure in a vacuum bag or vacuum ring at a predetermined vacuum, and
    soaking the assembled structure at a temperature about 5 to 10 degrees above the softening point of the interlayer for a soak time of between 30 minutes to 200 minutes and at a pressure between 30 psi and 200 psi.

10. The method of claim 1 wherein the glass laminate structure has an area greater than 1 $m^2$.

11. The method of claim 1 further comprising two or more non-deformable materials, wherein patterns of at least two of the two or more non-deformable materials are different and the pattern transferred to the glass laminate structure is a combination of the patterns of the two or more non-deformable materials.

12. A glass laminate structure formed by the methods of claim 1.

13. A method of cold forming a glass laminate structure comprising the steps of:
    assembling a multi-layer structure having two buffer plates and a glass laminate structure intermediate the two buffer plates, wherein the glass laminate structure includes two sheets of glass and a polymer interlayer intermediate the two sheets of glass and wherein one or both of the two buffer plates includes a pattern formed thereon or therein;
    placing the assembled structure in an autoclave;
    cold forming the glass laminate structure in the autoclave by heating the assembled structure to a temperature about 5 to 10 degrees above the softening point of the polymer interlayer for a predetermined period of time at a predetermined pressure;
    removing the assembled structure from the autoclave; and
    removing the glass laminate structure from between the buffer plates wherein the pattern formed in or on the one or both buffer plates has been transferred to the glass laminate structure as a function of variances of thicknesses in the glass laminate structure.

14. The method of claim 13 wherein the buffer plates are curved and the removed glass laminate structure includes both the pattern formed by the one or both buffer plates and the curvature of the buffer plates.

15. The method of claim 13 wherein one or both of the glass sheets is chemically-strengthened glass.

16. The method of claim 13 wherein the thicknesses of the first and second glass sheets are selected from the group consisting of a thickness not exceeding about 2.1 mm, a thickness not exceeding about 1.5 mm, a thickness not exceeding about 1.0 mm, a thickness not exceeding about 0.7 mm, a thickness not exceeding about 0.5 mm, a thickness within a range from about 0.3 to about 2.1 mm, from about 0.3 mm to about 1.0 mm, a thickness from about 0.3 mm to about 0.7 mm, and a thickness from about 0.5 mm to about 0.7 mm.

17. The method of claim 13 wherein the thicknesses of the first and second glass sheets are different.

18. The method of claim 13 wherein the composition of the first and second glass sheets are different.

19. The method of claim 13 wherein the polymer interlayer comprises a material selected from the group consisting of poly vinyl butyral (PVB), polycarbonate, acoustic PVB, ethylene vinyl acetate (EVA), thermoplastic polyurethane (TPU), ionomer, a thermoplastic material, polyurethanes, vulcanized rubber, polyester materials, ionomers, phenol-formaldehydes, urea-formaldehydes, epoxy resins, polyimides, melamine resins, esters, polycyanurates, esters, resins, epoxies, cross-linked polymers, reinforced polymeric materials, 2-part epoxies, 2-part urethanes, 2-part acrylics, 2-part silicones, moisture cure urethanes and epoxies, phenbolics, novolacs, melamine formaldehydes, alkyds, unsaturated polyesters, polyimides, polyamides, photo or electron beam curable polymers, and combinations thereof.

20. The method of claim 13 wherein each of the two buffer plates comprise a material selected from the group consisting of glass, soda lime glass, strengthened glass, ceramic, metal, and combinations thereof.

* * * * *